United States Patent Office 3,019,266
Patented Jan. 30, 1962

3,019,266
NITROBENZYLSULFONYLETHANOL COMPOUNDS
Saul R. Buc, Easton, Pa., and David I. Randall, New Vernon, N.J., assignors to General Aniline & Film Corporation, New York, N.Y., a corporation of Delaware
No Drawing. Filed Dec. 8, 1959, Ser. No. 858,035
6 Claims. (Cl. 260—607)

This invention relates to the provision of nitrobenzylsulfonylethanol compounds and more particularly to the provision of a novel group of nitrobenzene compounds containing at least one meta-substituted

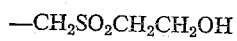

(methylenesulfonylethanol, hydroxyethylsulfonylmethyl) group. These compounds have been found to constitute highly desirable intermediates for the preparation of dyestuffs reactive with textile fibers and the like, as will be pointed out more fully below.

The objects and advantages of this invention are accordingly embodied in the provision of a group of compounds which may be broadly described as nitrobenzene compounds containing at least one meta-substituted methylenesulfonylethanol group. In a more specific sense, the compounds of this invention are those having the formula

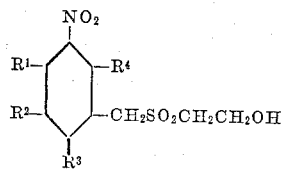

wherein $R^1$, $R^3$ and $R^4$ are selected from the group consisting of H, halogen, lower alkyl and lower alkoxy, and $R^2$ is selected from the group consisting of H, halogen, lower alkyl, lower alkoxy, and $-CH_2SO_2CH_2CH_2OH$. In this formula, $R^1$, $R^3$ and $R^4$ may be H, chloro, bromo, methyl, ethyl, methoxy or ethoxy or the like or any combination thereof. $R^2$ may have any of the values defined for $R^1$, $R^3$ and $R^4$ and may also be $-CH_2SO_2CH_2CH_2OH$.

The invention also includes a process for producing a nitrobenzene compound containing at least one meta-substituted methylenesulfonylethanol group comprising reacting one mole of a nitrobenzene compound containing at least one meta-substituted methylenethioethanol group ($-CH_2SCH_2CH_2OH$) with a molar amount of hydrogen peroxide about double the number of methylenethioethanol groups in said compound, if desired in the presence of a catalyst. The invention also resides in a process for producing a compound having the structural formula given above comprising reacting one mole of a compound of the formula

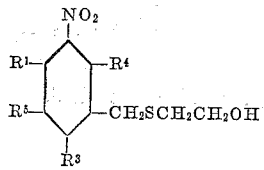

wherein $R^1$, $R^3$ and $R^4$ have the values given above and $R^5$ may have a similar value or may be $-CH_2SCH_2CH_2OH$, with a molar amount of hydrogen peroxide about double the number of $-CH_2SCH_2CH_2OH$ groups in said compound, if desired in the presence of a catalyst.

As stated above, the reaction requires the use of a molar amount of hydrogen peroxide about double the number of methylenethioethanol groups in the starting intermediate. Examples of such intermediates and methods for their production are disclosed and claimed in our copending application Serial No. 858,037 filed on even date herewith. These intermediates may generally be prepared by reaction of an appropriately substituted or unsubstituted nitrobenzene compound containing at least one meta-substituted chloromethyl group with a molar amount of mercaptoethanol about equal to the number of chloromethyl groups therein, in the presence of an acid binding agent.

As examples of intermediates containing methylenemercaptoethanol groups which may be subjected to oxidation for the production of the corresponding methylenesulfonylethanol-containing compounds in accordance with this invention, there may be mentioned 4-methoxy-3-nitrobenzylmercaptoethanol, 2 - methyl - 5 - nitrobenzylmercaptoethanol, 4 - methyl - 3 - nitrobenzylmercaptoethanol, 5 - nitro - 4 - methyl - m - xylylene - $\alpha^1$, $\alpha^3$ - bis-(2 - mercaptoethanol), 3 - chloro - 4 - methyl - 5 - nitrobenzylmercaptoethanol, 3 - chloro - 6 - methyl - 5 nitrobenzylmercaptoethanol, 2 - ethoxy - 5 - nitrobenzylmercaptoethanol, and 4 - ethoxy - 3 - nitrobenzylmercaptoethanol.

In carrying out the reaction, it is preferred to employ an aqueous medium although in some instances a water miscible organic solvent for the starting intermediate may be employed for solubilizing purposes. As examples of such auxiliary solvents, there may be mentioned methanol, ethanol, butanol, Cellosolves (lower alkyl and benzyl ethers of ethylene glycol), Carbitols (lower alkyl ethers of diethylene glycol), dioxane, acetone, methyl ethyl ketone, and the like. The reaction is initiated at any temperature from room temperature up to the boiling point of the medium. The hydrogen peroxide is gradually added to the reaction medium as the reaction proceeds to minimize loss due to vaporization, decomposition, and the like. The reaction theoretically proceeds in two stages, in the first of which the sulfide is oxidized to the sulfoxide and in the second of which the sulfoxide is oxidized to the sulfone. The first stage is exothermic in nature whereby the temperature of the reaction medium rises without introduction of heat, in some instances to the boiling point. The gradual addition of hydrogen peroxide may continue during the second stage or the entire amount of hydrogen peroxide required to oxidize the sulfoxide to the sulfone may be added after completion of the first stage of the reaction. In some instances the second stage is also exothermic whereby no heating is required, it being preferred to maintain the reaction medium at elevated temperatures, preferably at reflux, for a further period of time after addition of all the required hydrogen peroxide until the reaction is complete as shown by a negative test for peroxide on starch-iodide paper.

The hydrogen peroxide is preferably added in the form of the commercially available 30% aqueous solution although it may be added in any other form, e.g. from 5 to 100% concentration. To minimize loss due to decomposition of the hydrogen peroxide, it is in some instances preferred to maintain the pH of the reaction medium in the neutral or acid range. Since some decomposition of the hydrogen peroxide occurs during the reaction, it is desirable to add a molar excess which may range as high as six times the theoretical amount. Generally, the reaction is completed in from 5 to 20 hours or more, depending upon the temperature, which may range from about 70° C. up to the boiling point.

Other oxidizing agents have been suggested for oxidizing a sulfide to a sulfone, as for example chlorine, sodium hypochlorite, sodium chlorate in HCl, hydrogen peroxide in glacial acetic acid, etc. In the present process, however, care must be taken to prevent simultaneous oxidation of the terminal hydroxyl group. The above described process has been found to enable the desired oxidation to take place without undue side reactions. Thus, it has been found that when hydrogen peroxide in glacial acetic acid is employed, the terminal hydroxy group in the starting intermediate is simultaneously esterified to the acetate.

Following completion of the reaction, the desired product is readily separated from the reaction mass. In some instances, the desired product crystallizes out slowly during the reaction while in other instances, the product separates as an organic layer which crystallizes upon cooling. In either case, the product is readily filtered from the cooled reaction mass and may be further purified in any desired manner such as recrystallization, solvent extraction, or the like.

As stated above, the products of this invention are surprisingly effective in the production of dyestuffs and other substances reactive with textile fibers. For example, the product of the below example may be subjected to a reduction treatment to reduce the nitro group to the corresponding amino group, and the resulting amino compound reacted with a halogenated dyestuff of the anthraquinone series, azo series, etc. with liberation of a hydrohalide. α-Anthraquinone may be employed. Such amino compounds may also be employed in the production of novel reactive phthalocyanine dyestuffs as disclosed in the application of Buc et al., Serial No. 855,550, filed on November 27, 1959. Such dyestuffs are reactive with textile fibers and the like to produce dyeings having unexpectedly improved wash fastness properties and the like. It has been surprisingly found that isomers of the products of this invention containing a methylenesulfonylethanol group or groups in ortho or para position relative to the nitro group are substantially ineffective as suitable intermediates in the production of such dyestuffs.

The following example is only illustrative of the present invention and is not to be regarded as limitative. All parts and proportions referred to herein and in the appended claims are by weight unless otherwise indicated.

EXAMPLE

5 - nitrohemimellitylene - $\alpha^1,\alpha^3$ - bis - sulfonylethanol [5 - nitro - 2 - methyl - m - xylylene - $\alpha^1$, $\alpha^3$ - bis(2-sulfonylethanol)]

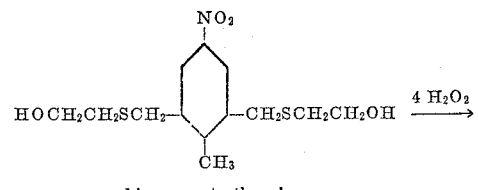
bis-mercaptoethanol

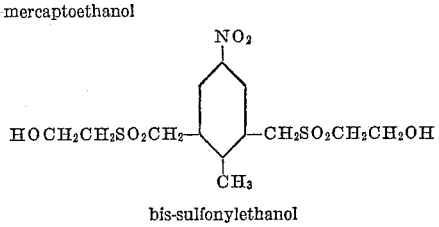
bis-sulfonylethanol

In a stirred flask charge 750 ml. water and 317 g. (1.0 mole) of above bis-mercaptoethanol compound. Heat to 60° C., start dropping in 30% hydrogen peroxide. The heat of oxidation is allowed to raise the temperature slowly to the reflux temperature. When about 220 g. of peroxide (2.0 moles) have been added the sulfide has been oxidized to the sulfoxide and is totally soluble in the water. An additional 260 g. of peroxide are now added all at once. (Total peroxide 480 g.=4.2 moles.) Refluxing is continued for 20 hours. The peroxide slowly disappears and crystals of product slowly form in the mixture. After 20 hours, the test for peroxide (starch-iodide paper) is negative. Cool, filter product, wash with water, air dry. Dry yield 316 g.=82% shown by analysis to be the desired bis-sulfonylethanol compound.

This invention has been disclosed with respect to certain preferred embodiments, and various modifications and variations thereof will become obvious to persons skilled in the art and are intended to be included within the spirit and scope of this invention.

We claim:
1. A compound of the formula

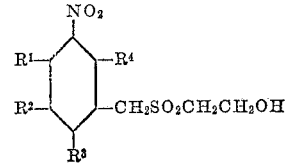

wherein $R^1$, $R^3$ and $R^4$ are selected from the group consisting of H, chlorine, bromine, lower alkyl and lower alkoxy, and $R^2$ is selected from the group consisting of H, lower alkyl, lower alkoxy, chlorine, bromine and —$CH_2SO_2CH_2CH_2OH$.

2. A compound as defined in claim 1 wherein $R^3$ is —$CH_3$, $R^2$ is —$CH_2SO_2CH_2CH_2OH$, and $R^1$ and $R^4$ are H.

3. A process for producing a compound as defined in claim 1 comprising reacting a compound of the formula

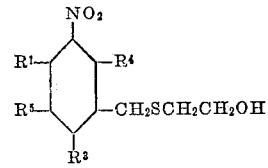

wherein $R^1$, $R^3$ and $R^4$ are selected from the group consisting of H, chlorine, bromine lower alkyl and lower alkoxy, and $R^5$ is selected from the group consisting of H, lower alkyl, lower alkoxy, chlorine, bromine, and —$CH_2SCH_2CH_2OH$ with a molar amount of hydrogen peroxide about double the number of —$CH_2SCH_2CH_2OH$ groups in said compound.

4. A process as defined in claim 3 carried out in an aqueous solution at boiling temperature.

5. A process for producing a compound as defined in claim 2 comprising reacting one mole of 5-nitro-hemimellitylene-$\alpha^1,\alpha^3$-bis-mercaptoethanol with about 4 moles of hydrogen peroxide.

6. A process as defined in claim 5 carried out in an aqueous solution at boiling temperature.

No references cited.